(12) United States Patent
Amemiya (10) Patent No.: US 7,859,781 B2
(45) Date of Patent: *Dec. 28, 2010

(54) HEAD IC THAT ADJUSTS THE AMPLITUDE LEVEL OF A READ SIGNAL OF A HEAD

(75) Inventor: Yoshihiro Amemiya, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 212 days.

This patent is subject to a terminal disclaimer.

(21) Appl. No.: 12/202,729

(22) Filed: Sep. 2, 2008

(65) Prior Publication Data

US 2009/0122434 A1 May 14, 2009

(30) Foreign Application Priority Data

Nov. 9, 2007 (JP) .............................. 2007-291763

(51) Int. Cl.
*G11B 5/09* (2006.01)
*G11B 5/02* (2006.01)

(52) U.S. Cl. .......................................... 360/46; 360/67
(58) Field of Classification Search ...................... None
See application file for complete search history.

(56) References Cited

U.S. PATENT DOCUMENTS

| 5,539,779 | A | | 7/1996 | Nagahori |
| 5,576,906 | A | | 11/1996 | Fisher et al. |
| 5,831,781 | A | | 11/1998 | Okamura |
| 5,862,005 | A | | 1/1999 | Leis et al. |
| 5,955,921 | A | * | 9/1999 | Ide et al. ..................... 330/254 |
| 6,018,554 | A | * | 1/2000 | Glover ........................ 375/345 |
| 6,452,990 | B1 | | 9/2002 | Leis et al. |
| 6,618,215 | B2 | | 9/2003 | Fung et al. |
| 2008/0100944 | A1 | * | 5/2008 | Matsui et al. ................. 360/46 |
| 2008/0123212 | A1 | * | 5/2008 | Amemiya ..................... 360/67 |
| 2009/0141386 | A1 | * | 6/2009 | Miura ......................... 360/46 |
| 2009/0147408 | A1 | * | 6/2009 | Yamasaki ................... 360/313 |

FOREIGN PATENT DOCUMENTS

| JP | A 53-27011 | 3/1978 |
| JP | A 63-237205 | 10/1988 |
| JP | 64-062806 | 3/1989 |
| JP | A 5-166198 | 7/1993 |
| JP | 07-006487 | 1/1995 |
| JP | 08-097349 | 4/1996 |

(Continued)

*Primary Examiner*—Daniell L Negrón
*Assistant Examiner*—Regina N Holder
(74) *Attorney, Agent, or Firm*—Greer, Burns & Crain, Ltd.

(57) ABSTRACT

A head IC, which adjusts an amplitude level of a read signal of a head, for outputting to a read channel having an AGC amplifier, includes: a differential amplifier; an AGC circuit; external gain setting sections; and a switch. Since the AGC amplifier is disposed in the head IC, the amplitude from the head is automatically adjusted in the head IC, and the signal level, which enters the input dynamic range of the AGC amplifier of the read channel, can be adjusted. The AGC amplifier can be operated as a fixed gain amplifier using a gain value which is set from the outside, so the power consumption can be minimized even if automatic adjustment is performed.

17 Claims, 9 Drawing Sheets

FOREIGN PATENT DOCUMENTS

| | | |
|---|---|---|
| JP | 09-139040 | 5/1997 |
| JP | A 10-21647 | 1/1998 |
| JP | 2000-187804 | 7/2000 |
| JP | 2001-093221 | 4/2001 |
| WO | WO 97/16010 | 5/1997 |

* cited by examiner

PRIOR ART

FIG.10

PRIOR ART

HEAD IC THAT ADJUSTS THE AMPLITUDE LEVEL OF A READ SIGNAL OF A HEAD

CROSS-REFERENCE TO RELATED APPLICATIONS

This application is based upon and claims the benefit of priority from the prior Japanese Patent Application No. 2007-291763, filed on Nov. 9, 2007 the entire contents of which are incorporated herein by reference.

BACKGROUND OF THE INVENTION

1. Field of the Invention

The present invention relates to a head IC, a read circuit, and a media storage device which adjusts an output level of read signals of a head, and more particularly to a head IC, read circuit, and a media storage device which adjusts the read signals of heads having different output levels to a predetermined level.

2. Description of the Related Art

In a media storage device, such as a magnetic disk device, a head reads data from media. Along with an increase in track density in recent years, heads having high sensitivity in detecting the magnetic flux on the media are being provided, where an MR (Magnetic Resistance) element is used for a read head. On the other hand, the use of a TuMR (or TMR) element, which utilizes the tunnel effect, is under consideration as an element having a higher detection sensitivity.

The output level of such a read element is not constant, but changes depending on the characteristic change of the element due to temperature change and the fluctuation of the floating amount. Therefore a circuit to adjust the output level of the read element is required before demodulating data.

Figure 9:
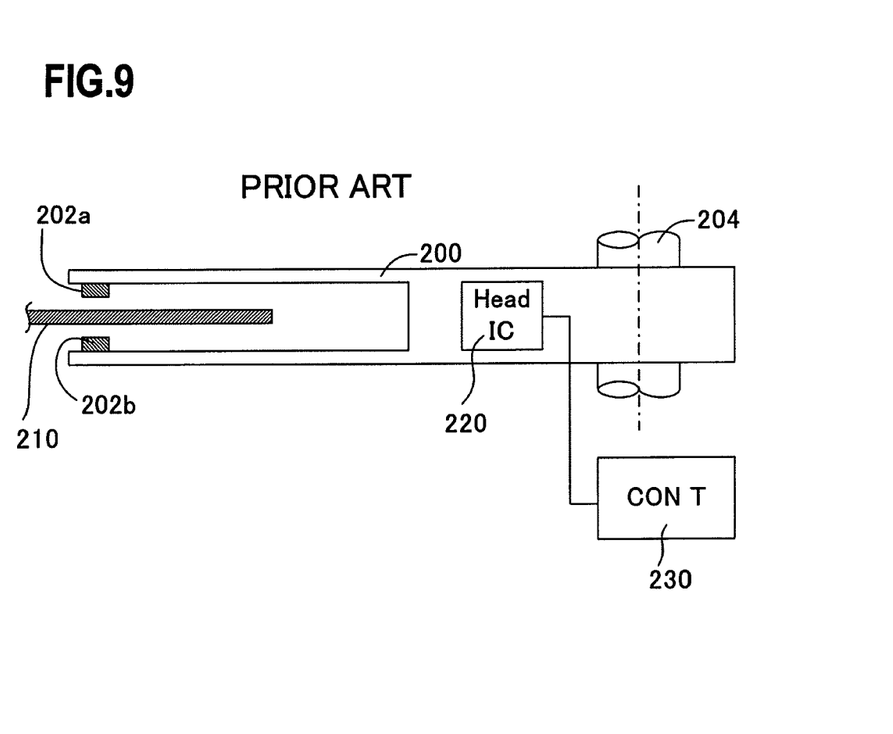
FIG. 9 is a diagram depicting a configuration of a conventional media storage device.
Figure 10:
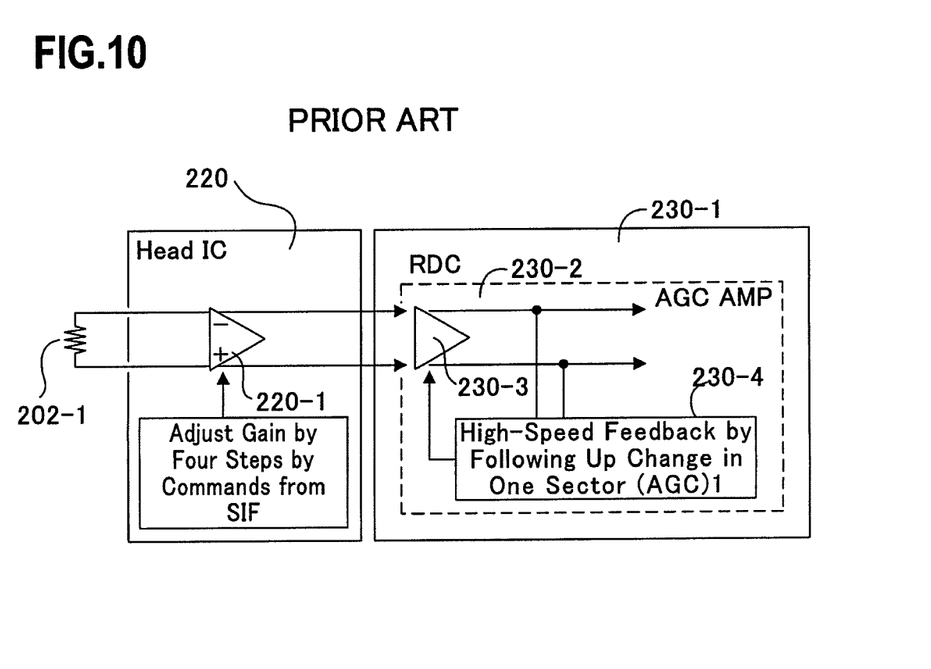
FIG. 10 is a block diagram of a conventional read circuit.

FIG. 9 is a diagram depicting a configuration of a conventional media storage device, and FIG. 10 is a block diagram of a conventional read circuit. As FIG. 9 shows, magnetic heads 202a and 202b, to read data on media (magnetic disk) 210, are disposed at the tip of an actuator 200.

The actuator 200 rotates around a rotation axis 204 so as to position the magnetic heads 202a and 202b on a desired track of the magnetic disk 210. The magnetic heads 202a and 202b are connected to a head IC 220 provided in the actuator 200, and the head IC 220 is connected to a control circuit 230 outside the actuator 200.

Since the distances from the magnetic heads 202a and 202b to the control circuit 230 are long, the signal levels of the magnetic heads 202a and 202b may change, and noise may enter, so the head IC 220, which adjusts the signal level, is disposed between the magnetic heads 202a and 202b and the control circuit 230. This head IC 220 also plays a part of integrating many signal lines between the magnetic head and the control circuit to simplify wiring. For example, the control circuit 230 and the head IC 220 are connected via a differential transmission line, and the head IC 220 and each magnetic head 202a and 202b are connected with individual signal lines.

FIG. 10 is a detailed diagram of a read system circuit in FIG. 9. As shown in FIG. 10, a variable gain amplifier (preamplifier) 220-1 is disposed in the head IC 220, which is connected to a read element 202-1 of the magnetic head 202a (or 202b), and amplifies the output of the read element 202 at a gain which is set. In the variable gain amplifier 220-1, the number of settings in the gain adjustment range is a few, and gain is set and adjusted for each head before the device is shipped.

In the control circuit 230, which is connected to the head IC 220, a read channel 230-1 is disposed, and an AGC (Automatic Gain Control) amplifier 230-2, disposed in the read channel 230-1, receives output from the variable gain amplifier 220-1 of the head IC 220.

The AGC amplifier 230-2 is comprised of a differential amplifier 230-3 and an AGC circuit 230-4. The AGC circuit 230-4 compares an output value of the differential amplifier 230-3 and a reference output value, feeds back the comparison result to adjust the gain of the differential amplifier 230-3, and adjusts the output level of the differential amplifier 230-3 to the reference level (e.g. see Japanese Patent Application Laid-Open No. H10-021647 (FIG. 1)).

The AGC circuit 230-4 sets a high-speed feedback coefficient (frequency, gain change amount) which follows up the change in one sector of a track of the magnetic disk 210, and equalizes the signal level within one sector.

In the prior art, the fluctuation of the output level caused by the characteristics of the element itself and the fluctuation, due to environmental conditions, including the floating amount change, are mainly adjusted by the AGC amplifier of the read channel.

However use of the TuMR element, which has a higher detection sensitivity, is desired as this read element, due to the recent increase in recording density. This read element having a higher detection sensitivity is about 10 times that of an MR element, but dispersion of the signal output level is also high accordingly.

Also the fluctuation of the signal level, due to the fluctuation of temperature and floating amount, is also high because the detection sensitivity is high. When such major fluctuations of the signal level occur, it is difficult that the AGC amplifier in the read channel adjusts the signal level.

Also because of the increase in recording density, circuit frequency has increased, and a high-speed AGC amplifier of the read channel is also demanded. In this high-speed AGC amplifier the input dynamic range of the AGC is decreased. As a result, it is difficult to adjust the fluctuation of the level by changing the AGC amplifier of the read channel.

It could be possible to adjust the setting value of the variable gain amplifier, but adjusting the setting value of the variable gain amplifier is difficult since the number of setting steps are few. It could be possible to adjust the setting value of the variable gain amplifier by increasing the number of setting steps, but this spreads the distribution of the gain setting which is set initially, and adjustment before reading the system area of the disk takes time.

Also increasing the number of steps requires considering relationships with the dynamic range of the AGC amplifier of the read channel, which increases the adjustment time even more, and limits the adjustment of the level fluctuation.

SUMMARY OF THE INVENTION

With the foregoing in view, it is an object of the present invention to provide a head IC, read circuit and media storage device that automatically adjust the output fluctuation of the head.

It is another object of the present invention to provide a head IC, read circuit and media storage device that automatically adjust the output fluctuation of the head, even if dispersion of the head output level is major.

It is still another object of the present invention to provide a head IC, read circuit and media that automatically adjust the output fluctuation of the head, even if the input dynamic range of the AGC circuit of the read channel becomes narrow.

It is still another object of the present invention to provide a head IC, read circuit and media storage device that automatically adjust the output fluctuation of the head, and decrease the power consumption.

To achieve these objects, a head IC of the present invention is a head IC, which adjusts an amplitude level of a read signal of a head and outputs to a read channel having an AGC amplifier, having: a differential amplifier for amplifying the read signal by a gain which is set; an AGC circuit that determines a difference between at least one of an input and an output amplitude levels of the differential amplifier and a reference level in response to an AGC enable signal from an external device, and automatically controls a gain value of the differential amplifier according to a predetermined lock-in characteristic; an interface unit for receiving a gain value, which is set, from the external device; and a switch for selectively setting the gain value of the AGC circuit or the gain value from the interface unit in the differential amplifier in response to the AGC enable signal.

A read circuit of the present invention has a head IC that adjusts an amplitude level of a read signal from the head, and a read channel that is connected to the head IC and has an AGC amplifier. The head IC has: a differential amplifier for amplifying the read signal by a gain which is set; and an AGC circuit that determines a difference between at least one of an input and an output amplitude levels of the differential amplifier and a reference level in response to an AGC enable signal from an external device, and automatically controls a gain value of the differential amplifier according to a predetermined lock-in characteristic; an interface unit for receiving a gain value which is set from the read channel; and a switch for selectively setting the gain value of the AGC circuit or the gain value from the interface unit in the differential amplifier in response to the AGC enable signal.

The media storage device of the present invention has a head for reading information from a medium, a head IC that adjusts an amplitude level of a read signal from the head, and a read channel that is connected to the head IC and has an AGC amplifier. The head IC has: a differential amplifier for amplifying the read signal by a gain which is set; an AGC circuit that determines a difference between at least one of an input and an output amplitude level of the difference amplifier and a reference level using an AGC enable signal from an external device, and automatically controls a gain value of the differential amplifier according to a predetermined lock-in characteristic; an interface unit for receiving a gain value, which is set, from the read channel; and a switch for selectively setting the gain value of the AGC circuit or the gain value from the interface unit in the differential amplifier in response to the AGC enable signal.

In the present invention, it is preferable that the differential amplifier operates as an AGC amplifier by the AGC circuit when the AGC enable signal is ON, and operates as a fixed amplifier using the setting gain from an extern device provided when the AGC enable signal is OFF.

It is preferable that the present invention further has a latch circuit for latching a gain value from the switch, and setting the gain value in the differential amplifier.

In the present invention, it is preferable that the interface unit reads a gain value acquired by operating the AGC circuit using the AGC enable signal from the latch circuit to an external device as an initial value, receives the read initial value from the external device, and outputs the initial value to the switch.

In the present invention, it is preferable that the AGC circuit has a gain error computing unit for computing a difference between at least one of an input and output amplitude levels of the differential amplifier and a reference level, a low pass filter for cutting high frequency components out of the output of the difference, and a gain multiplier for controlling a gain of the differential amplifier by multiplying the output of the low pass filter by a predetermined feedback gain.

It is preferable that the present invention has a head switching unit that connects any of a plurality of heads to the differential amplifier according to a head select signal, wherein the interface unit receives the gain value of the selected head, and sets a gain value, which corresponds to the selected head, in the differential amplifier.

Since the AGC amplifier is disposed in the head IC, the amplitude from the head is automatically adjusted in the head IC, and the output of the signal level can be adjusted within the input dynamic range of the AGC amplifier of the read channel. Also the present invention has a configuration where the AGC amplifier can be operated as a fixed gain amplifier using a gain value which is set from the outside, so the power consumption can be minimized even if automatic adjustment is performed.

DESCRIPTION OF THE PREFERRED EMBODIMENTS

Embodiments of the present invention will now be described in the sequence of a media storage device, first embodiment of a read circuit, first embodiment of read operation, second embodiment of read operation, third embodiment of read operation, second embodiment of a read circuit and other embodiments, but the present invention is not limited to these embodiments.

(Media Storage Device)

Figure 1:
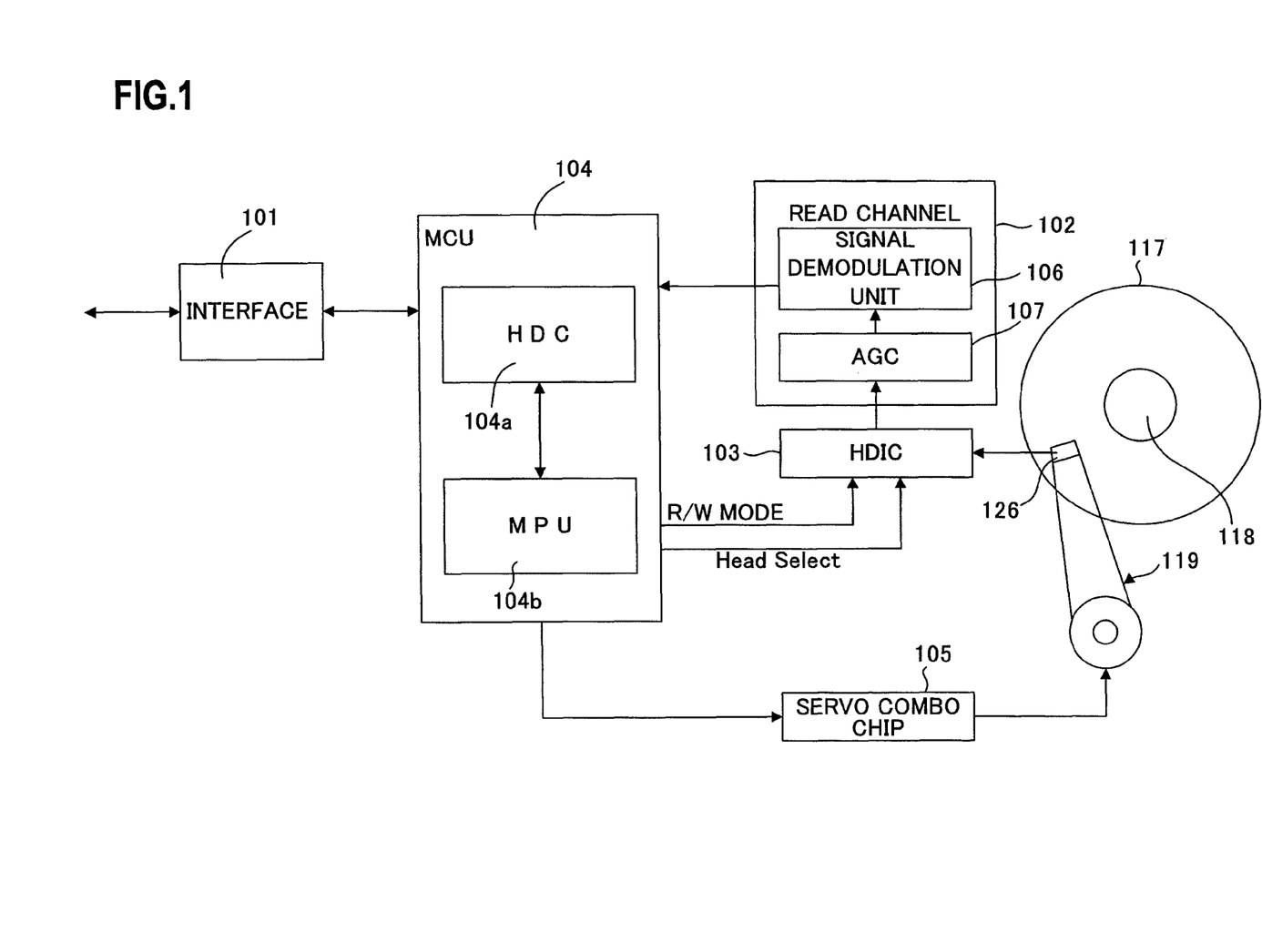
FIG. 1 is a diagram depicting a configuration of a media storage device according to an embodiment of the present invention.

FIG. 1 is a diagram depicting a configuration of a media storage device according to an embodiment of the present invention. FIG. 1 shows a magnetic disk device as the media storage device. As FIG. 1 shows, a magnetic disk 117, which is a magnetic storage media, is installed on a rotation axis 118 of a spindle motor. The spindle motor rotates the magnetic disk 117. An actuator (VCM) 119 has a magnetic head 126 at the tip, and moves the magnetic head 126 in the radius direction of the magnetic disk 117.

The actuator 119 is composed of a voice coil motor (VCM) which rotates around the rotation axis. When two magnetic disks 117 are installed on the magnetic disk device, four magnetic heads 126, for reading/writing each surface of magnetic disks, are simultaneously driven by the same actuator 119.

The magnetic head 126 is comprised of a read element and a write element. For example, the magnetic head 126 is constructed by layering a read element, including a tunnel effect magneto-resistance (TuMR) element, on a slider, and layering a write element, including a write coil, thereon.

A head IC 103 is disposed on a side face of the actuator 119, as shown in FIG. 10, and is comprised of a read system circuit, including an AGC amplifier, and a write circuit, as described in FIG. 2 and later, where a read signal from the read element of the magnetic head 126 is amplified and output in read mode, and write drive current is supplied to the write element of the magnetic head 126 in write mode.

A read channel 102 has a read system circuit and a write systems circuit, and the read system circuit further has an AGC amplifier 107 and a signal demodulation circuit 106. A micro controller (MCU) 104 comprises a hard disk controller (HDC) 104a and a microprocessor (MPU) 104b.

The hard disk controller (HDC) 104a analyzes a command, judges a position of a magnetic head in a track based on a sector number of a servo signal, controls recording/reproducing of data, and temporarily stores read data or write data. The MPU 104b controls each unit, and also detects (demodulates) a current position based on a servo position signal from the signal demodulation circuit 106, and computes a VCM drive command value for the actuator 119, according to an error between the detected current position and the target position.

A servo combo circuit 105 drives an actuator 119 (supplies drive current) using a VCM drive command value, and also drives the spindle motor. An interface circuit 101 communicates with a host using such an interface as USB (Universal Serial Bus), SATA (Serial AT Attached) or SCSI (Small Component System Interface).

Servo signals (position signals) are disposed on the magnetic disk 117 in a circumferential direction in each track from the outer circumference to the inner circumference of the magnetic disk 117. Each track is comprised of a plurality of sectors, and servo signals are recorded in each sector. A servo signal is comprised of a servo mark, a track number, index, offset information (servo burst) PosA, PosB, PosC and PosD.

This position signal is read by the head 126, and the position of the magnetic head in the radius direction is detected using the track number and the offset information PosA, PosB, PosC and PosD. Also based on the index signal Index, the position of the magnetic head in the circumference direction is detected.

In order to read these position signals and data, the level of the read output of the read element of the magnetic head 126 is adjusted by the head IC 103, and is adjusted to a predetermined level by the AGC circuit 107 of the read channel 102.

(First Embodiment of Read Circuit)

Figure 2:
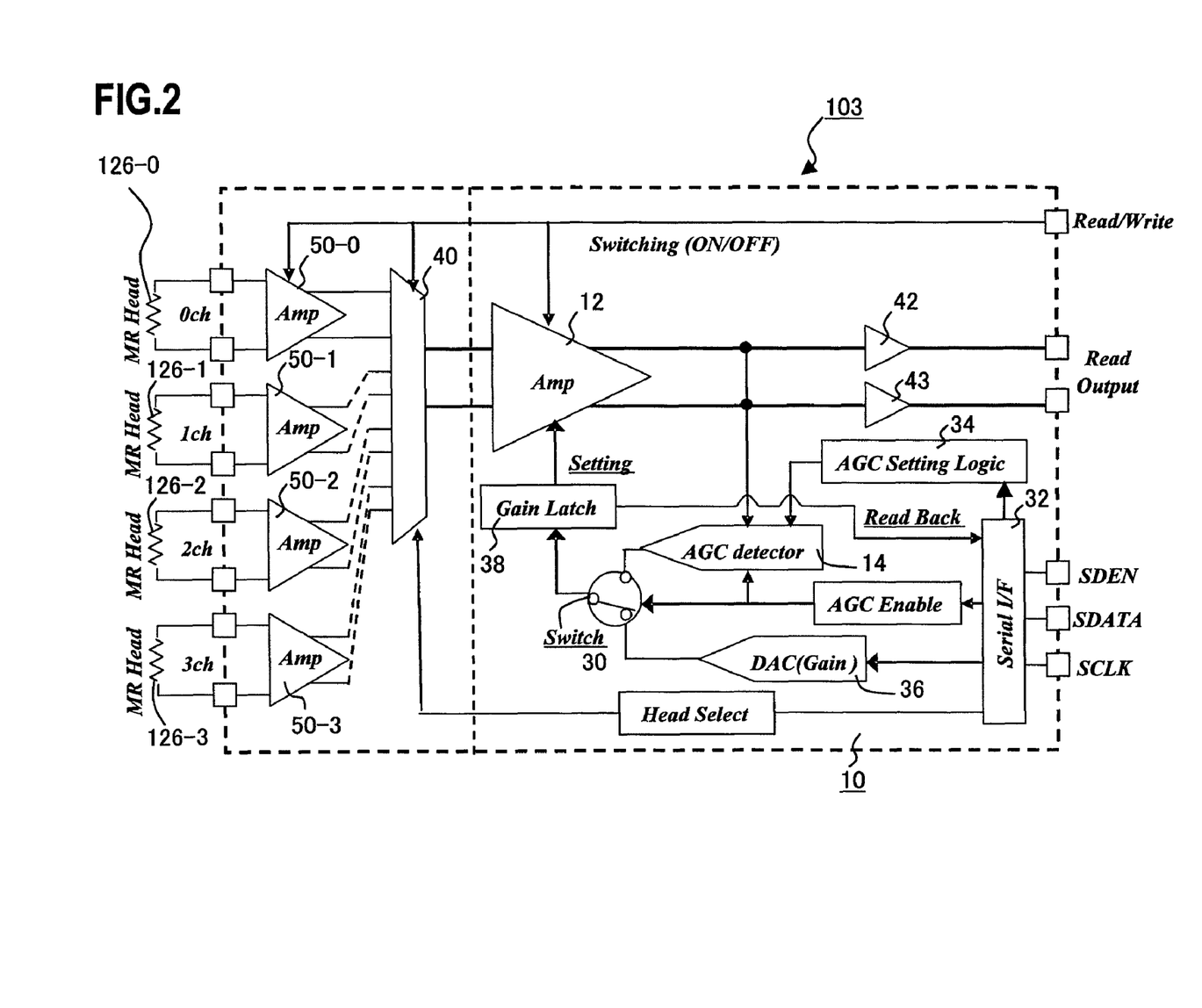
FIG. 2 is a circuit diagram depicting a first embodiment of the read circuit of the present invention.
Figure 3:
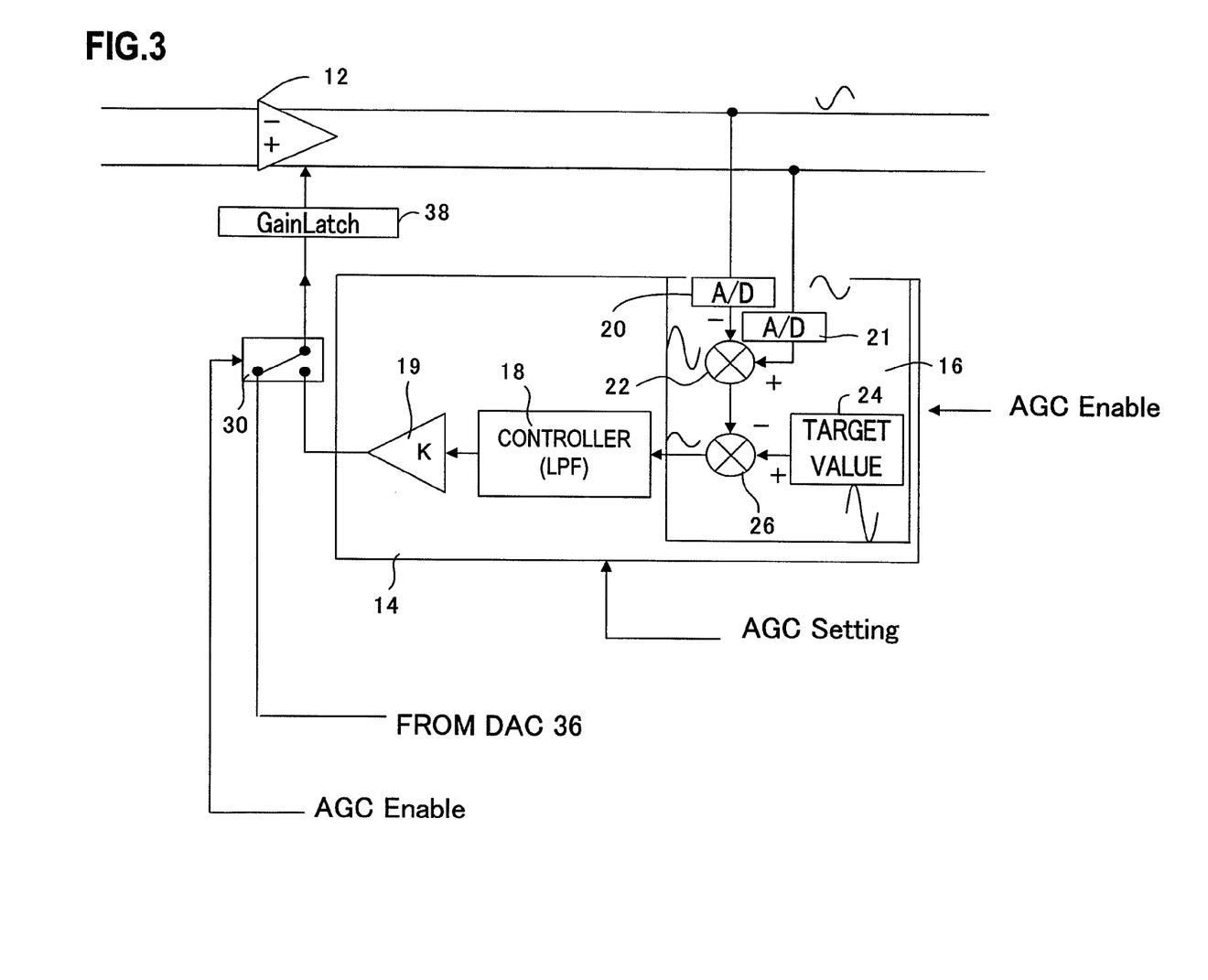
FIG. 3 is a circuit diagram depicting the AGC detector in the configuration in FIG. 2.

FIG. 2 is a circuit diagram depicting the first embodiment of the read circuit of the present invention. FIG. 3 is a circuit diagram depicting the AGC detector in the configuration in FIG. 2. In FIG. 2, composing elements the same as FIG. 1 are denoted with the same symbols, and four (four channels) of read elements (TuMR elements) 126-0 to 126-3 are connected to the head IC 103.

The head IC 103 has preamplifiers 50-0 to 50-3 for amplifying the outputs of each read element 126-0 to 126-3, and a head selection circuit (multiplexer) 40 for selecting an output of one of the preamplifiers 50-0 to 50-3 by a head selection signal.

The head IC 103 also has an AGC amplifier unit 10. This AGC amplifier unit 10 has a differential amplifier 12 to which the terminal voltages of the read elements (TuMR elements) 126-0 to 126-3 is input via the multiplexer 40, and buffer amplifiers 42 and 43 for outputting the output of the differential amplifier 12 to an AGC amplifier 107 of a read channel 102.

The AGC amplifier unit 10 has a serial interface unit 32 that receives a serial data enable signal SDEN, serial data SDATA and serial clock SCLK from a read channel 102, an AGC detection circuit 14 that receives an AGC enable signal from the serial interface unit 32, and automatically controls the gain of the differential amplifier 12, and an AGC setting logic circuit 34 that sets a set value (e.g. feedback gain) of the AGC detection circuit 14 by an AGC setting instruction from the serial interface unit 32.

The AGC amplifier unit 10 also has a DAC (Digital/Analog Convertor) 36 that converts a gain instruction value from the serial interface unit 32 into an analog quantity, a switch 30 that switches the AGC detection circuit 14 or the DAC 36 using an AGC enable signal from the serial interface unit 32, and a latch circuit 38 that latches a gain from the switch 30. The gain of the latch circuit 38 is set for the gain of the differential amplifier 12. The gain of the latch circuit 38 is read by the read channel 102 via the serial interface unit 32, and is supplied to an MCU 104, as mentioned later.

As FIG. 3 shows, the AGC detection circuit 14 has a gain error detector 16, a feedback controller (low pass filter) 18 and a gain multiplier 19.

The gain error detector 16 has a first A/D converter 20 for converting a minus side voltage of the differential amplifier 12 from analog into digital, a second A/D converter 21 for converting a plus side voltage of the differential amplifier 12 from analog into digital, a first computing unit 22 for determining the difference of the outputs of these A/D converters 20 and 21 and extracting the amplitude, a memory 24 for storing a target value (waveform) of the amplitude, and a second computing unit 26 for computing the difference of the target value of the amplitude of the memory 24 and the amplitude detected by the first computing unit 22. This difference is the gain error.

The feedback controller 18 is composed of a low pass filter, cuts the high frequency components of the gain error signal and forms a loop so as to follow up the gain error signal which has low frequency. The gain multiplier 19 determines an amplification factor by multiplying the output of the low pass filter 18 by 'K', which is a feedback gain, and controls the gain of the differential amplifier 12. If the value of the feedback gain K is small, the feedback response speed is slow, and if the value of the feedback gain K is large, the feedback response speed is fast.

In this way, according to an instruction from the outside, the head IC 103 can use both a gain adjustment mode of the AGC amplifier 12 by the AGC and a mode of operating the AGC amplifier 12 by the gain instructed from the outside.

Therefore the initial gain can be adjusted using the gain adjustment mode of the AGC, and even if the dispersion of the characteristics of the heads is major, the amplitude can be adjusted to an amplitude which enters a dynamic range of the AGC circuit of the read channel circuit 102 at high-speed.

Also when this initial adjustment value is stored in memory, a corresponding initial gain can be read and set in the AGC amplifier 12 when a head is selected, whereby an optimum gain can be set without requiring AGC operation. In other words, since the AGC detection circuit 14 is not operated, a considerable effect to decrease power consumption is acquired. In the case of installing this head IC in a portable equipment of which supplied power is limited, this effect of decreasing power consumption is major. Particularly the AGC execution time can be minimized, and as a result, general power consumption can be decreased, and read operation can be performed at an optimum gain even if heads disperse considerably.

(First Embodiment of Read Operation)

Figure 4:
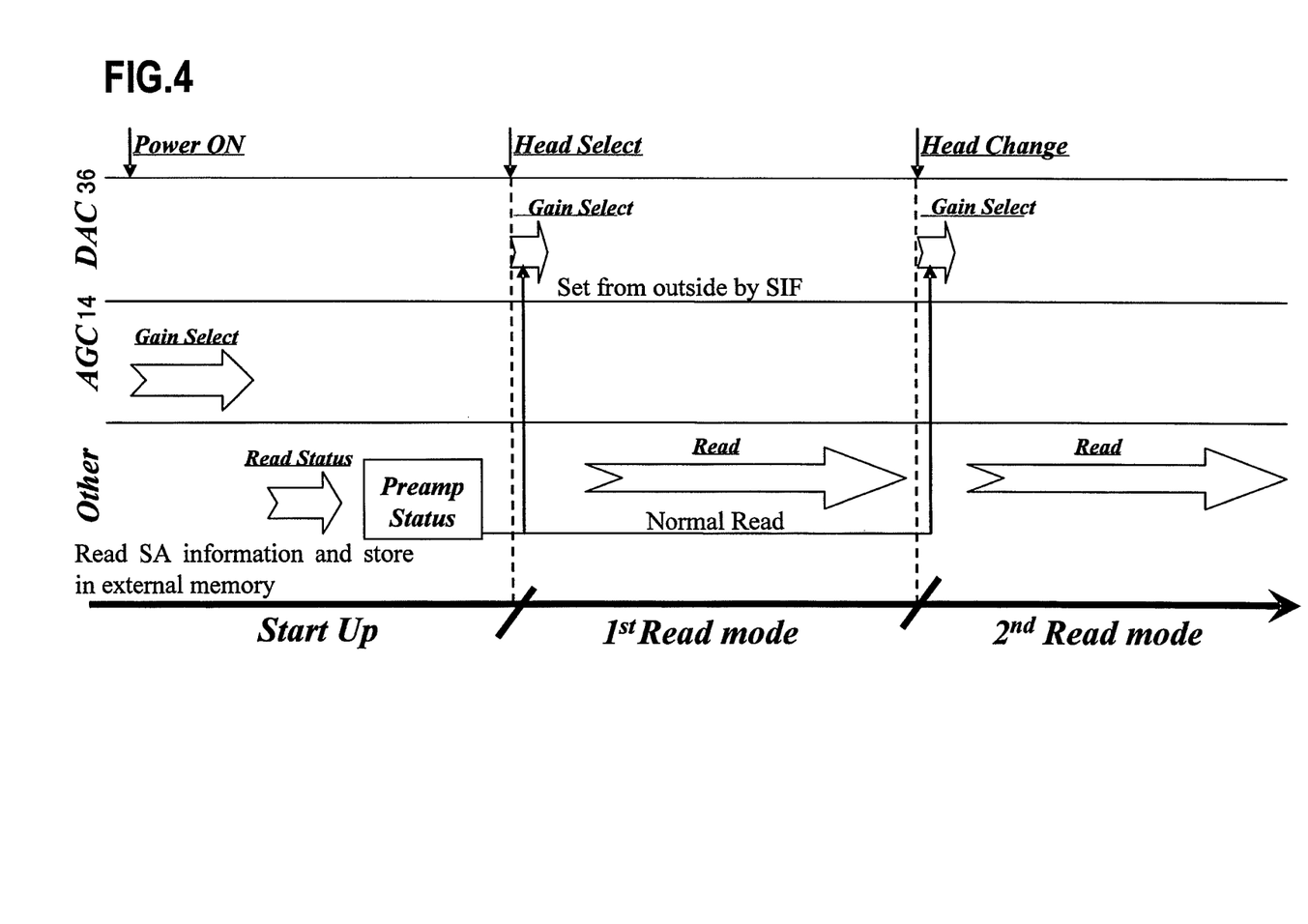
FIG. 4 is a diagram depicting a first embodiment of the read circuit of the present invention.
Figure 5:
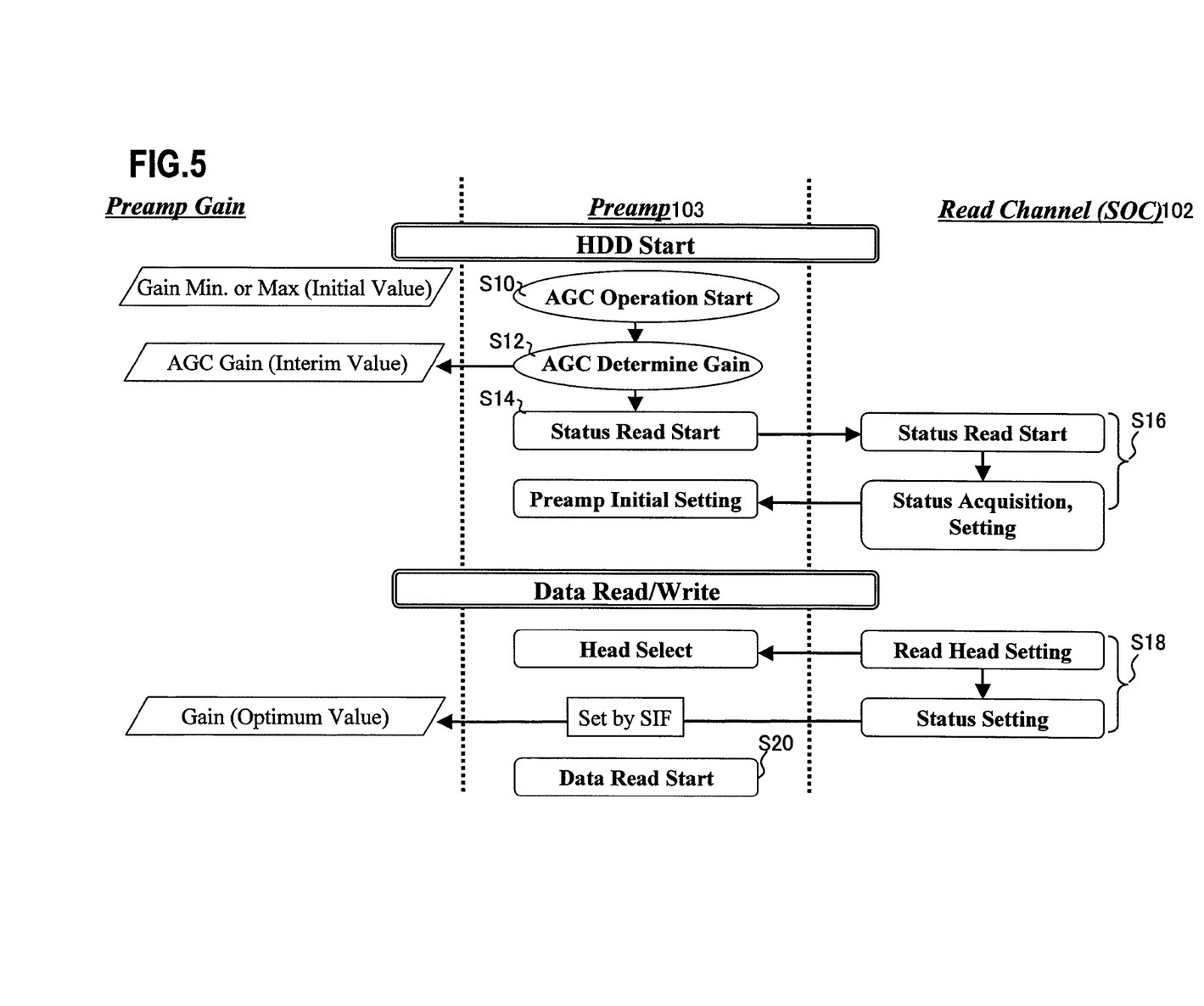
FIG. 5 is a sequence diagram of a read operation according to the first embodiment of FIG. 4.

FIG. 4 is a sequence diagram of a read operation according to an embodiment of the present invention, and FIG. 5 is a diagram depicting an optimum gain value search processing thereof.

The read operation will now be described according to FIG. 5, with reference to FIG. 4.

(S10) When power of the magnetic disk device is turned ON, the MCU 104 sends a AGC enable signal to the serial interface unit 32 of the head IC (Preamp in FIG. 5) 103 via the read channel circuit 102. By this, the switch 30 selects the AGC detection circuit 14, and the AGC detection circuit 14 is enabled.

In other words, the terminal voltages of one of the read elements 126-0 to 126-3 are input to the differential amplifier 12 of the head IC 103 via the multiplexer 40, and a pair of differential amplification signals are output. The pair of differential amplification signals are input to the differential amplifier 107-1 of the AGC amplifier 107 of the read channel circuit 102. In this case, the data is not demodulated in the read channel circuit 102, so it does not matter whether the AGC operation of the read channel circuit 102 is enabled or not.

In the AGC detection circuit 14 of the AGC amplifier 10, on the other hand, the first and second A/D converters 20 and 21 convert the minus side voltage and the plus side voltage of the differential amplifier 12 from analog into digital respectively, and the first computing unit 22 determines the difference of the outputs of these A/D converters 20 and 21, and extracts the amplitude.

Then the second computing unit 26 computes a difference between the amplitude target value from the memory 24, which stores amplitude target values (waveforms), and the amplitude detected by the first computing unit 22, and outputs a gain (amplification factor) error. The low pass filter 18 cuts the high frequency components of the gain error signals using the cut off frequency which is set, and extracts low frequency gain error signals. The gain multiplier 19 determines an amplification factor by multiplying the output of the low pass filter 18 by K, which is the feedback gain, sets it in the gain latch circuit 38 via the switch 30, and controls the gain of the differential amplifier 12. It is assumed that the gain value of the latch circuit 38 has been initialized to a minimum value or a maximum value.

(S12) When the AGC enable signal turns OFF or when a predetermined time has elapsed since the AGC enable signal is received, the head IC 103 judges this as gain determined, and stops operation of the AGC detection circuit 14. By this, the AGC gain of the latch circuit 38 becomes an interim value.

(S14) By this, the head IC 103 notifies the start of reading status to the MCU 104 via the read channel circuit 102.

(S16) The MCU 104 positions the magnetic head 126 on the system area of the magnetic disk 117, and instructs reading to the head IC 103 and the read channel circuit 102. In the system area of the magnetic disk 117, the status information of the device (optimum gain/read current/voltage of each head, boost amount of the write waveform, various setting parameters) has been stored. The MCU 104 reads the data in the system area of the magnetic disk 117 via the head IC 103 and the read channel circuit 102, sets it in each unit, and sets the read current/voltage of the TuMR element and boost amount of the write waveform of the write element in the head IC 103 via the read channel circuit 102.

By this, preparation for the data read/write operation completes.

(S18) When the MCU 104 reads or writes data, the MCU 104 sends a head select signal to the head IC 103 via the read channel circuit 102. By this, the multiplexer 40 selects the instructed head. The MCU 104 also sends the initial gain value of the head to the serial interface (SIF) unit 32 of the head IC 103 via the read channel circuit 102, and the DAC 36 outputs the instructed gain amount. Since the AGC enable signal is OFF at this time, the switch 30 is connected with the DAC 36. Therefore the provided initial gain amount is set in the latch circuit 38. In other words, the AGC amplifier 12 performs the amplification operation with the gain amount which is set. This means that the AGC amplifier 12 operates with a fixed gain.

(S20) Then the data read is started with this gain.

If the head is changed, as shown in FIG. 4, a head select signal is sent to the head IC 103, as shown in S18, and the multiplexer 40 selects the instructed head. Then the MCU 104 sends the initial gain value of the selected head to the serial interface (SIF) unit 32 of the head IC 103 via the read channel circuit 102, and outputs the instructed gain amount from the DAC 36. Since the AGC enable signal is OFF at this time, the switch 30 is connected with the DAC 36. Therefore the provided initial gain amount is set in the latch circuit 38. In other words, the AGC amplifier 12 performs the amplification operation with the gain amount which is set.

(Second Embodiment of Read Operation)

Figure 6:
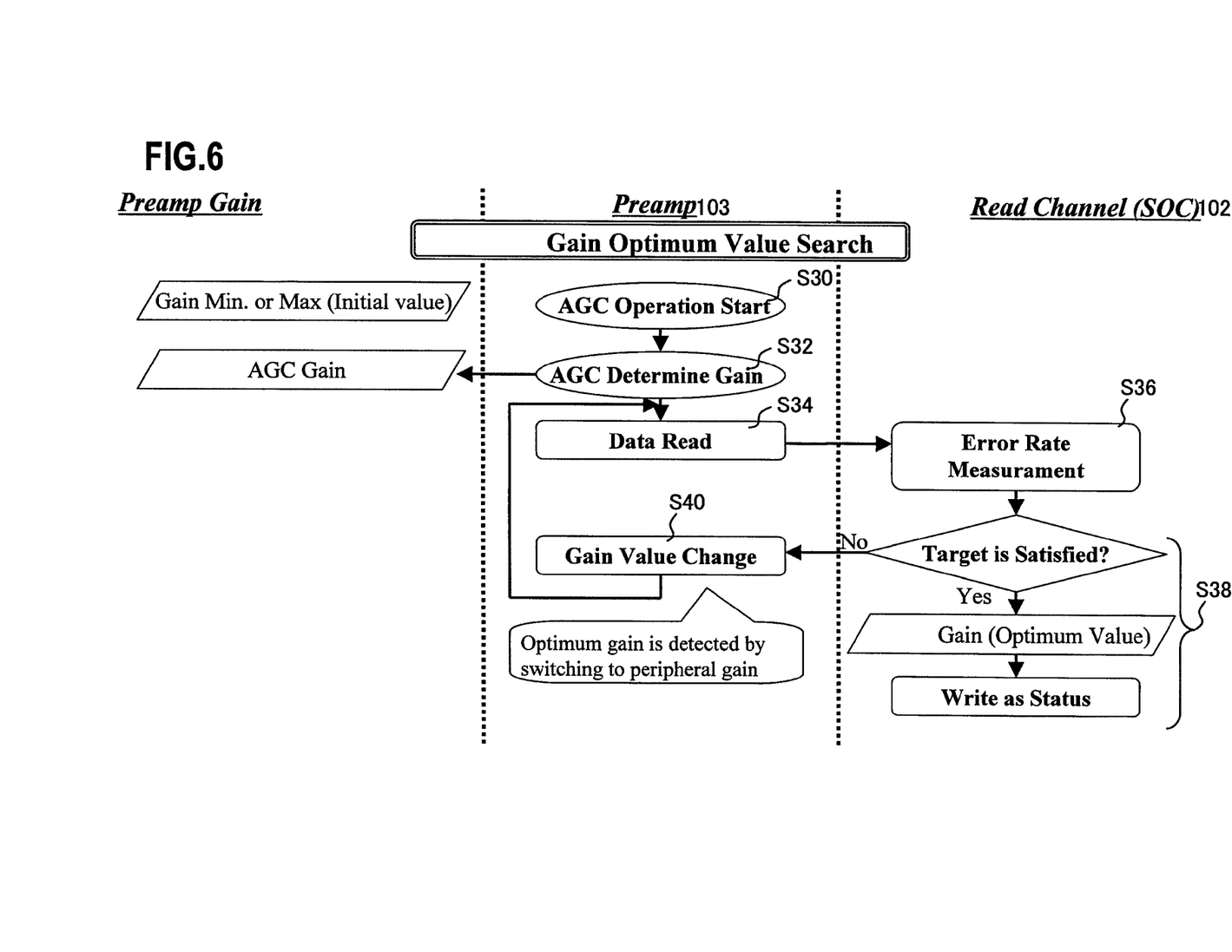
FIG. 6 is a diagram depicting a second embodiment of the read processing of the present invention.

FIG. 6 is a diagram depicting a second embodiment of the read processing of the present invention. FIG. 6 shows a processing to measure and store an optimum gain before shipping the device.

(S30) When the optimum gain measurement processing is started, the MCU 104 sends an AGC enable signal to the serial interface unit 32 of the head IC ("Preamp" in FIG. 6) 103 via the read channel circuit 102, just like step S10. By this, the switch 30 selects the AGC detection circuit 14, and the AGC detection circuit 14 is enabled.

By this, the terminal voltages of one of the read elements 126-0 to 126-3 are input to the differential amplifier 12 of the head IC 103 via the multiplexer 40, and a pair of differential amplification signals are output, and the pair of differential amplification signals are input to the differential amplifier 107-1 of the AGC amplifier 107 of the read channel circuit 102.

In the AGC detection circuit 14 of the AGC amplifier 10, on the other hand, the first and second A/D converters 20 and 21 convert the minus side voltage and plus side voltage of the differential amplifier 12 from analog into digital respectively, and the first computing unit 22 determines the difference of outputs of these A/D converters 20 and 21, and extracts the amplitude.

Then the second computing unit 26 computes a difference between the amplitude target value from the memory 24 which stores amplitude target values (waveforms) and the amplitude detected by the first computing unit 22, and outputs the gain (amplification factor) error. The low pass filter 18 cuts the high frequency components of the gain error signals using the cut off frequency which is set, and extracts low frequency gain error signals. The gain multiplier 19 determines an amplification factor by multiplying the output of the low pass filter 18 by K, which is the feedback gain, sets it in the gain latch circuit 38 via the switch 30, and controls the gain of the differential amplifier 12. It is assumed that the gain value of the latch circuit 38 has been initialized to a minimum value or a maximum value.

(S32) When the AGC enable signal turns OFF, or when a predetermined time has elapsed since the AGC enable signal is received, the head IC 103 stops operation of the AGC detection circuit 14, regarding this state as gain determined. By this, the AGC gain of the latch circuit 38 becomes an interim value.

(S34) By this, the head IC 103 starts data read, and outputs the read signal of the head to the read channel circuit 102.

(S36) The read channel circuit 102 demodulates the read signal, and detects whether data is normal or erred, and notifies this information to the MCU 104. By this notice, the MCU 104 measures the error rate.

(S38) After reading a predetermined number of data and measuring the error rate, the MCU 104 judges whether the measured error rate satisfies the target. If it is judged that the measured error rate satisfies the target value, the MCU 104 reads the determined gain of the head IC 103, and stores it in the memory as an optimum value. In this case, it is preferable to store the optimum value in the system area of the magnetic disk 117.

(S40) If it is judged that the measured error rate does not satisfy the target value, the MCU 104 changes the gain value of the head IC 103. In other words, the MCU 104 reads the gain value G of the latch circuit 38 via the read channel circuit 102, adds an adjustment value α thereto, and sends this added value (G+α) to the serial interface (SIF) unit 32 of the head IC 103, and outputs the gain amount instructed by the DAC 36. In other words, the measured gain value is changed to a peripheral value thereof. Then processing returns to step S34.

When a plurality of magnetic heads is installed, an interim value (initial value) of the AGC gain of each magnetic head is measured and stored in the memory.

(Third Embodiment of Read Operation)

Figure 7:
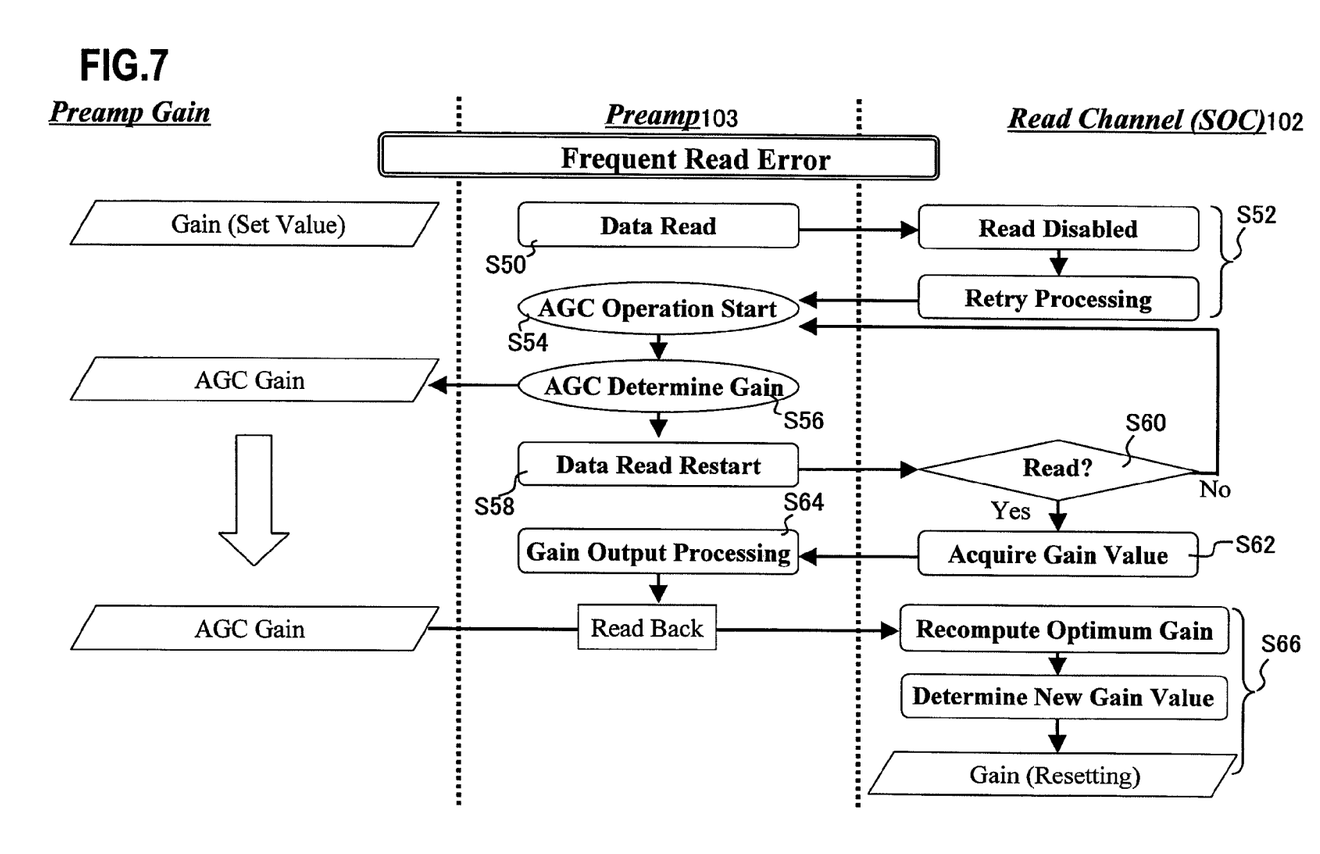
FIG. 7 is a diagram depicting a third embodiment of the read processing of the present invention.

FIG. 7 is a diagram depicting a third embodiment of the read processing of the present invention. FIG. 7 shows a processing to re-measure and store an optimum gain when a read error occurs frequently after the device is shipped.

(S50) During data read, the head IC 103 in which a fixed gain is set outputs a read signal of the head to the read channel circuit 102.

(S52) The read channel circuit 102 demodulates a read signal and detects whether the data is normal or erred, and notifies this information to the MCU 104. The MCU 104 executes retry processing if this notice shows a data error.

(S54) As a part of this retry processing, the MCU 104 sends an AGC enable signal to the serial interface unit 32 of the head IC ("Preamp" in FIG. 7) 103 via the read channel circuit 102, just like step S10. By this, the switch 30 selects the AGC detection circuit 14, and the AGC detection circuit 14 is enabled.

By this, the terminal voltages of one of the read elements 126-0 to 126-3 are input to the differential amplifier 12 of the head IC 103 via the multiplexer 40, and a pair of differential amplification signals are output, and the pair of differential amplification signals are input to the differential amplifier 107-1 of the AGC amplifier 107 of the read channel circuit 102.

In the AGC detection circuit 14 of the AGC amplifier 10, on the other hand, the first and second A/D converters 20 and 21 convert the minus side voltage and plus side voltage of the differential amplifier 12 from analog into digital respectively, and the first computing unit 22 determines the difference of outputs of these A/D converters 20 and 21, and extracts the amplitude.

Then the second computing unit 26 computes a difference between the amplitude target value from the memory 24, which stores the amplitude target values (waveforms), and the amplitude detected by the first computing unit 22, and outputs the gain (amplification factor) error. The low pass filter 18 cuts the high frequency components of the gain error signals using the cut off frequency which is set, and extracts low frequency gain error signals. The gain multiplier 19 determines an amplification factor by multiplying the output of the low pass filter 18 by K, which is the feedback gain, sets it in the gain latch circuit 38 via the switch 30, and controls the gain of the differential amplifier 12. It is assumed that the gain value of the latch circuit 38 is the set value in FIG. 5 or FIG. 6.

(S56) When the AGC enable signal turns OFF or when a predetermined time has elapsed since the AGC enable signal is received, the head IC 103 stops operation of the AGC detection circuit 14, regarding this state as gain determined. By this, the AGC gain of the latch circuit 38 becomes an optimum value.

(S58) By this, the head IC 103 restarts data read, and outputs the read signal of the head to the read channel circuit 102.

(S60) The read channel circuit 102 demodulates the read signal, and detects whether data is normal or erred, and notifies this information to the MCU 104. If the MCU 104 judges that the reading is not normal, processing returns to step S54.

(S62) If reading is normal, the MCU 104 instructs the read channel circuit 103 to acquire the gain value.

(S64) The read channel circuit 103 reads the determined gain of the latch circuit 38 of the head IC 103, and transfers it to the MCU 104.

(S66) The MCU 104 recalculates the optimum gain. For example, the optimum gain is recalculated by adding the previous gain value and the gain value acquired by measuring this time, and dividing the result by 2. This recalculated gain value is determined as a new gain value, and is stored in the memory as the optimum value. In this case, it is preferable that the new gain value is stored in the system area of the magnetic disk 117.

In this way, in the first place, the AGC amplifier 10 is disposed in the head IC 103, so the amplitude from the head 126-1 is automatically adjusted in the head IC 103, and the signal level that enters the input dynamic range of the AGC amplifier 107 of the read channel 102 can be adjusted.

Also the AGC operation of the AGC amplifier 10 is minimized, so power consumption can be decreased, and the speed of lock-in of the AGC can be increased.

(Second Embodiment of Read Circuit)

Figure 8:
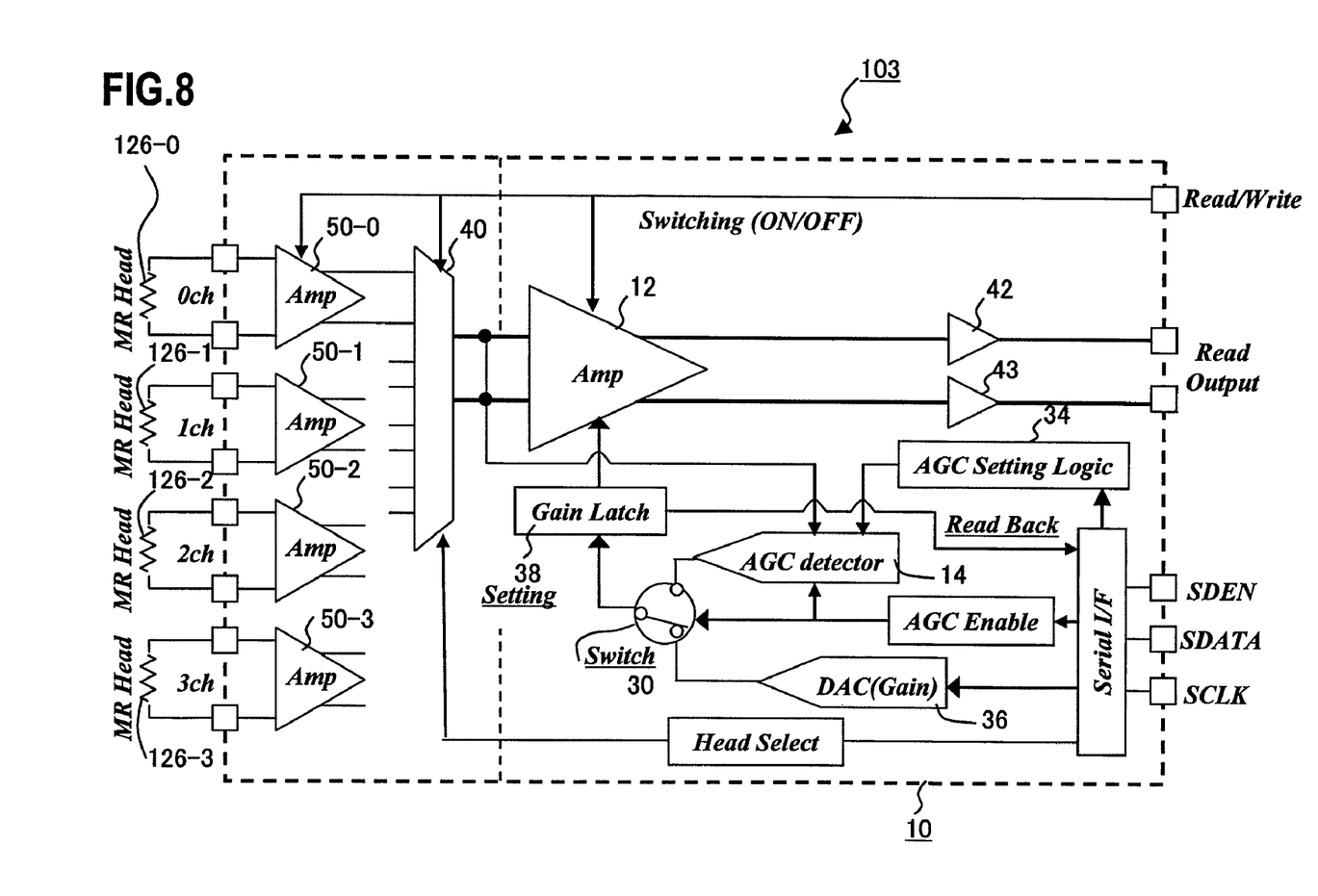
FIG. 8 is a circuit diagram depicting the second embodiment of the read circuit of the present invention.

FIG. 8 is a circuit diagram depicting the second embodiment of the read circuit of the present invention. In FIG. 8, composing elements the same as FIG. 1 and FIG. 2 are denoted with the same symbols, and four (four channels) of read elements (TuMR elements) 126-0 to 126-3 are connected to the head IC 103.

A head IC 103 has preamplifiers 50-0 to 50-3 for amplifying the outputs of each read element 126-0 to 126-3, and a head selection circuit (multiplexer) 40 for selecting an output of one of the preamplifiers 50-0 to 50-3 by a head selection signal.

The head IC 103 also has an AGC amplifier unit 10. This AGC amplifier unit 10 has a differential amplifier 12 to which terminal voltage of the read elements (TuMR elements) 126-0 to 126-3 are input via the multiplexer 40, and buffer amplifiers 42 and 43 for outputting the output of the differential amplifier 12 to an AGC amplifier 107 of a read channel 102.

The AGC amplifier unit 10 has a serial interface unit 32 that receives a serial data enable signal SDEN, serial data SDATA and serial clock SCLK from the read channel 102, an AGC detection circuit 14 that receives an AGC enable signal from the serial interface unit 32, and automatically controls the gain of the differential amplifier 12, and an AGC setting logic circuit 34 that sets a set value (e.g. feedback gain) of the AGC detection circuit 14 by the AGC setting instruction from the serial interface unit 32.

The AGC amplifier unit 10 also has a DAC (Digital/Analog converter) 36 that converts a gain instruction value from the serial interface unit 32 into an analog quantity, a switch 30 that switches the AGC detection circuit 14 or the DAC 36 using an AGC enable signal from the serial interface unit 32, and a latch circuit 38 that latches a gain from the switch 30. The gain of the latch circuit 38 is set for the gain of the differential amplifier 12. The gain of the latch circuit 38 is read by the read channel 102 via the serial interface unit 32, and is supplied to an MCU 104, as mentioned later.

Furthermore, according to this embodiment, the AGC detection circuit 14 performs AGC operation using the signal in the input stage of the differential amplifier 12 as an input. In other words, the present embodiment is a feed forward type AGC. The example in FIG. 2, on the other hand, is a feedback type AGC.

An operation similar to the feedback type AGC in FIG. 2 can also be implemented by using such a feed forward type AGC.

Other Embodiments

In the above mentioned embodiments the AGC circuit was described using the configuration in FIG. 3 and others, for example, but another AGC circuit, such as an analog type AGC circuit and an AGC circuit having a peak hold circuit and integration circuit, can also be used. Also an example of the read circuit of the head of the magnetic disk device was described, but the present invention can also be applied to a read circuit of other media storage devices.

The preferred embodiments described herein are therefore illustrative and not restrictive, the scope of the invention indicated by the embodiments and all variations with come within the meaning of the claims are intended to be embraced therein.

Since the AGC amplifier is disposed in the head IC, the amplitude from the head is automatically adjusted in the head IC, and the signal level which enters the input dynamic range of the AGC amplifier of the read channel can be adjusted. Also the present invention has a configuration where the AGC amplifier can be operated as a fixed gain amplifier by a gain value which is set from the outside, so the power consumption can be minimized even if automatic adjustment is performed.

What is claimed is:

1. A head IC, which adjusts an amplitude level of a read signal of a head, and outputs to a read channel having an AGC amplifier, comprising:
    a differential amplifier for amplifying the read signal by a gain which is set;
    an AGC circuit that determines a difference between at least one of an input and output amplitude levels of the differential amplifier and a reference level in response to an AGC enable signal from an external device, and automatically controls a gain value of the differential amplifier according to a predetermined lock-in characteristic;
    an interface unit for receiving a gain value, which is set, from said external device;
    a switch for selectively setting the gain value of the AGC circuit or the gain value from the interface unit in the differential amplifier in response to the AGC enable signal; and
    a latch circuit for latching a gain value from the switch and setting the gain value in the differential amplifier.

2. The head IC according to claim 1, wherein the differential amplifier operates as an AGC amplifier by the AGC circuit when the AGC enable signal is ON, and operates as a fixed amplifier using the setting gain from an external device when the AGC enable signal is OFF.

3. The head IC according to claim 1, wherein the interface unit reads a gain value acquired by operating the AGC circuit in response to the AGC enable signal from the latch circuit, outputs said gain value to an external device as an initial value, and receives the read initial value from the external device, and outputs the initial value to the switch.

4. The head IC according to claim 1, wherein the AGC circuit comprises:
    a gain error computing unit for computing a difference between said input or output amplitude level of the differential amplifier and a reference level;
    a low pass filter for cutting high frequency components out of the output of the difference; and
    a gain multiplier for controlling a gain of the differential amplifier by multiplying the output of the low pass filter by a predetermined feedback gain.

5. The head IC according to claim 1, further comprising a head switching unit that connects anyone of a plurality of heads to the differential amplifier according to a head select signal,
    wherein the interface unit receives the gain value of the selected head, and sets a gain value, which corresponds to the selected head, to the differential amplifier.

6. A read circuit which adjusts an amplitude level of a read signal of a head, comprising:
    a head IC that adjusts an amplitude of a read signal from the head; and
    a read channel that is connected to the head IC and has an AGC amplifier,
    wherein said head IC comprises:
    a differential amplifier for amplifying the read signal by a gain which is set;
    an AGC circuit that determines a difference between at least one of an input and output amplitude levels of the differential amplifier and a reference level in response to an AGC enable signal from an external device, and automatically controls a gain value of the differential amplifier according to a predetermined lock-in characteristic;
    an interface unit for receiving a gain value which is set from the read channel;
    a switch for selectively setting the gain value of the AGC circuit or the gain value from the interface unit in the differential amplifier in response to the AGC enable signal; and
    a latch circuit for latching a gain value from the switch and setting the gain value in the differential amplifier.

7. The read circuit according to claim 6, wherein the differential amplifier operates as an AGC amplifier by the AGC circuit when the AGC enable signal is ON, and operates as a fixed amplifier by the gain which is set from the read channel when the AGC enable signal is OFF.

8. The read circuit according to claim 6, wherein the interface unit reads a gain value acquired by operating the AGC circuit, in response to the AGC enable signal, from the latch circuit, outputs the gain value to the read channel as an initial value, and receives the read initial value from the read channel, and outputs the initial value to the switch.

9. The read circuit according to claim 6, wherein the AGC circuit comprises:
   a gain error computing unit for computing a difference between said input or output amplitude level of the differential amplifier and a reference level;
   a low pass filter for cutting high frequency components out of the output of the difference; and
   a gain multiplier for controlling a gain of the differential amplifier by multiplying the output of the low pass filter by a predetermined feedback gain.

10. The read circuit according to claim 6, further comprising a head switching unit that connects anyone of a plurality of heads to the differential amplifier according to a head select signal,
   wherein the interface unit receives the gain value of the selected head from the read channel, and sets the gain value, which corresponds to the selected head, in the differential amplifier.

11. The read circuit according to claim 10, further comprising a memory that stores the gain value received by the selected head by the AGC operation in response to turning ON of the AGC enable signal, when a device power is ON, from the read channel,
   wherein the read channel outputs the gain value of the selected head in the memory to the interface unit of the head IC according to the selection of the head.

12. A media storage device comprising: a head for reading data from a medium;
   a head IC that adjusts an amplitude level of a read signal from the head; and
   a read channel that is connected to the head IC and has an AGC amplifier,
   wherein said head IC comprises:
   a differential amplifier for amplifying the read signal by a gain which is set;
   an AGC circuit that determines a difference between at least one of an input and output amplitude levels of the differential amplifier and a reference level in response to an AGC enable signal from an external device, and automatically controls a gain value of the differential amplifier according to a predetermined lock-in characteristic;
   an interface unit for receiving a gain value, which is set, from the read channel;
   a switch for selectively setting the gain value of the AGC circuit or the gain value from the interface unit in the differential amplifier in response to the AGC enable signal; and
   a latch circuit for latching a gain value from the switch and setting the gain value in the differential amplifier.

13. The media storage device according to claim 12, wherein the differential amplifier operates as an AGC amplifier by the AGC circuit when the AGC enable signal is ON, and operates as a fixed amplifier by the gain, which is set, from the read channel when the AGC enable signal is OFF.

14. The media storage device according to claim 12, wherein the interface unit reads a gain value acquired by operating the AGC circuit in response to the AGC enable signal from the latch circuit, outputs said gain value to the read channel as an initial value, and receives the read initial value from the read channel, and outputs the initial value to the switch.

15. The media storage device according to claim 12, wherein the AGC circuit comprises:
   a gain error computing unit for computing a difference of said input or output amplitude level of the differential amplifier and a reference level;
   a low pass filter for cutting high frequency components out of the output of the difference; and
   a gain multiplier for controlling a gain of the differential amplifier by multiplying the output of the low pass filter by a predetermined feedback gain.

16. The media storage device according to claim 12, further comprising a head switching unit that connects any one of a plurality of heads to the differential amplifier according to a head select signal,
   wherein the interface unit receives the gain value of the selected head from the read channel, and sets the gain value, which corresponds to the selected head, in the differential amplifier.

17. The media storage device according to claim 12, further comprising a memory that stores the gain value received by the selected head by the AGC operation in accordance with turning ON of the AGC enable signal, when a device power is ON, from the read channel,
   wherein the read channel outputs the gain value of the selected head in the memory to the interface unit of the head IC according to the selection of the head.

* * * * *